US 6,584,275 B1
United States Patent
Blatter

(12) United States Patent
(10) Patent No.: US 6,584,275 B1
(45) Date of Patent: Jun. 24, 2003

(54) CONTROL OF CONSUMER RECORDING EQUIPMENT

(75) Inventor: Harold Blatter, Indianapolis, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/319,685

(22) PCT Filed: Dec. 17, 1997

(86) PCT No.: PCT/US97/22834
§ 371 (c)(1),
(2), (4) Date: Jun. 9, 1999

(87) PCT Pub. No.: WO98/28913

PCT Pub. Date: Jul. 2, 1998

(30) Foreign Application Priority Data

Dec. 20, 1996 (GB) .............................................. 9626574

(51) Int. Cl.[7] ............................ H04N 5/91; G11B 19/04
(52) U.S. Cl. ............................................ 386/94; 360/60
(58) Field of Search .............................. 386/52, 94, 46, 386/4, 1, 109; 360/15, 13, 60; 380/201, 203; 705/57; H04N 5/91; G11B 19/04

(56) References Cited

U.S. PATENT DOCUMENTS 5,889,919 A * 3/1999 Inoue et al.

FOREIGN PATENT DOCUMENTS

| EP | 0498617 A2 | 8/1992 | ............ H04N/5/91 |
| EP | 0498617 | 8/1992 | ............ H04N/5/91 |
| EP | 0574892 | 12/1993 | ............ H04N/9/80 |
| EP | 0574892 A2 | 12/1993 | ............ H04N/9/80 |
| EP | 0701374 A2 | 3/1996 | ............ H04N/7/24 |
| EP | 0701374 | 3/1996 | ............ H04N/7/24 |
| EP | 0717564 A2 | 6/1996 | .......... H04N/5/913 |
| EP | 0717564 | 6/1996 | .......... H04N/5/913 |

* cited by examiner

Primary Examiner—Robert Chevalier
(74) Attorney, Agent, or Firm—Joseph S. Tripoli; Harvey D. Fried; Francis A. Davenport

(57) ABSTRACT

An apparatus for processing a source of compressed digital video and control data occuring in transport packets. The apparatus comprises a deriving means responsive to the source for deriving copy control data from the transport packets. A generating means responsive to the copy control data for generating a copy control word. A forming means for forming a superpacket including the copy control word and the transport packets.

28 Claims, 3 Drawing Sheets

CONTROL OF CONSUMER RECORDING EQUIPMENT

This invention relates to a bus interface system/apparatus for coupling digital audio, video and data processing systems, and in particular to coupling signals for control of recording apparatus.

BACKGROUND OF THE INVENTION

The advent of digitally compressed audio and video transmission systems, such as the Grand Alliance HDTV system for terrestrial high definition television broadcasting, or the DirecTV™ direct broadcast satellite TV system currently employing the NTSC system, demonstrate that virtually studio quality audio and video signals can be delivered to a viewing audience. However, such exemplary quality signals are instantly degraded when time shifted for later viewing by means of currently available consumer analog recording formats, for example, VHS, S-VHS, 8 mm and Hi 8.

The introduction of consumer quality digital video recording cameras, for example DVC, demonstrates that consumer quality digital recording may yield sound and picture quality virtually indistinguishable from the original material. Other consumer products are emerging, for example, D-VHS, video disc, DVD, digital cameras, scanners and computers with digital processing capabilities which permit multiple generation digital signal dubbing, copying, replicating or editing, with sound and picture quality remaining essentially equal to that of the original recorded source. The high levels of technical quality and performance delivered by such consumer digital equipment raises concern with respect to copyright infringement by unauthorized copying. Proposed legislation in the form of the "VIDEO HOME RECORDING ACT of 1996" requires that digital audio/video signals include copy protection information to allow the copyright owner to determine and control the audience size viewing the copyrighted material. Implementation of copy protection requires that copy control information be included with or within the copyrighted material and be maintained throughout subsequent processing procedures. In addition such copy control information may be amended as a result of subsequent processing to retain control the copyright owner's intellectual property. A digital recording device is disclosed in EP A 0 498 617 which extracts copy control data from an input data stream to control recording and to amend copy contol data subsequent to recording. A further digital recording device is disclosed in EP A 0 717 564 which accepts an MPEG bit stream containing a PES header which includes copyright and copy control data. The recording device decodes and decrypts copy prevention information and in response thereto encrypts the bit stream for recording. A second embodiment disclosed in EP 0 574 892 is directed to copy control by means of information superimposed in one horizontal period of the vertical blanking interval of an analog video signal.

SUMMARY OF THE INVENTION

In an inventive arrangement, an apparatus processes a source of compressed digital audio, video and control data occurring in transport packets. The apparatus comprises a deriving means responsive to the source for deriving copy control data from the transport packets. A generating means responsive to the copy control data for generating a copy control word. A forming means for forming a superpacket including the copy control word and the transport packets. In a further inventive arrangement copy control information is derived from a packetized source and processed for coupling via a control data bus. In another inventive arrangement a replicating device receives the formatted transport packet with copy control header and responsive to the copy control information initiates replication and amends the copy control header to preclude any further copying of the formatted transport packet and copy control header. In yet another inventive arrangement a replicating device receives the formatted transport packet and copy control header and the copy control information from a control data bus. The replicating device implements commands contained in the copy control information only if the copy control information from the two sources correspond. In yet a further inventive arrangement a replicating device periodically receives copy control information from a control data bus and absent said periodic reception assumes a copy prohibited status. Another inventive arrangement controls a replicating device responsive to copy control information such that a copy is made but simultaneous transport packet decoding for viewing is precluded.

DETAILED DESCRIPTION

The Grand Alliance HDTV terrestrial system and the DirecTV™ system utilize an MPEG standard and an MPEG like standard respectively to transmit program material in transport packets. The transport packets may contain multiple programs which are multiplexed together and processed for transmission. At the receiver error correction is performed and a user determined program packet stream is separated and assembled from the multiplexed mixture of programs. The burgeoning array of consumer digital audio and video products, computers, imaging apparatus etc. necessitated a simple, low cost means for interconnection. For example, a serial data bus has been standardized by the IEEE and is known as 1394. The 1394 standard multiplexes a variety of compressed digital audio, video, MIDI and device control commands onto two twisted pair conductors. A third conductor pair provides one conductor for power supply ground with the second conductor providing an optional coupling for power insertion or extraction. Devices may be interconnected in a daisy chain manner by a small, thin, flexible cable terminated with standardized connectors. An example of a simplified bus is depicted in the block diagram of FIG. 1. The simplified bus provides coupling of serial digital audio, video and control transport packet streams and is described in U.S. application Ser. No. 08/292,908 and PCT Applications Ser. Nos. PCT/US96/07581, and PCT/US96/07391.

Figure 1:
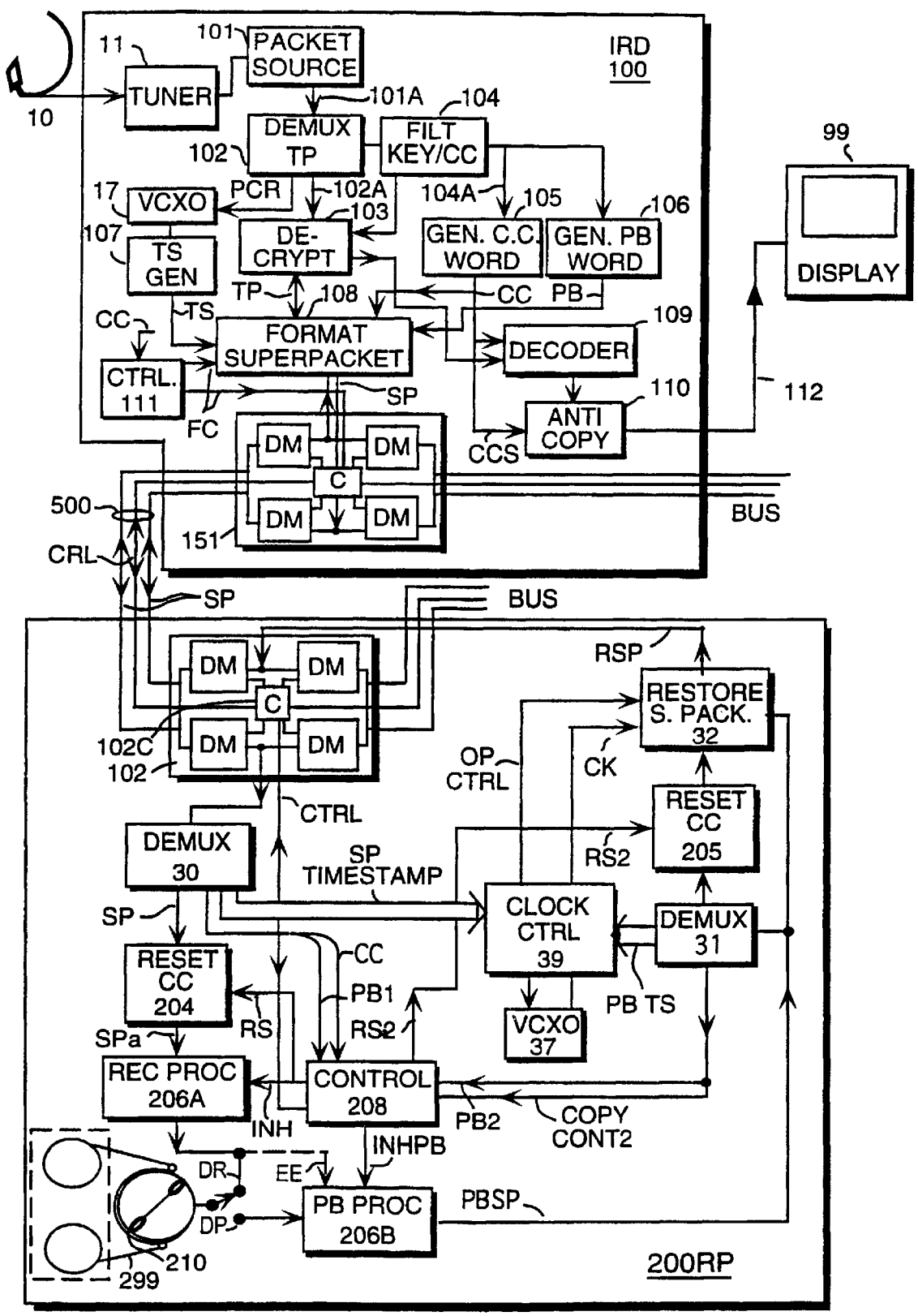
FIG. 1 illustrates an exemplary digital receiver and digital replicator employing various inventive arrangements.

However, a simplified description of the system depicted in FIG. 1 is as follows. An integrated receiver decoder or IRD 100, receives a radio frequency signal from, for example, antenna 10 or a cable source, not shown. The radio frequency signal is tuned by tuner 11 to receive a user selected program. The tuner output signal is coupled to packet source block 101, which demodulates and error corrects the modulated transmission signal. An output from packet source 101 is coupled to block 102 which demultipexes or separates the user's selected program transport stream TP from other program streams present in the received packet stream. The user selected transport stream TP may be coupled for MPEG decoding by decoder 109 which generates audio and video signals for display 99.

Figure 2A:
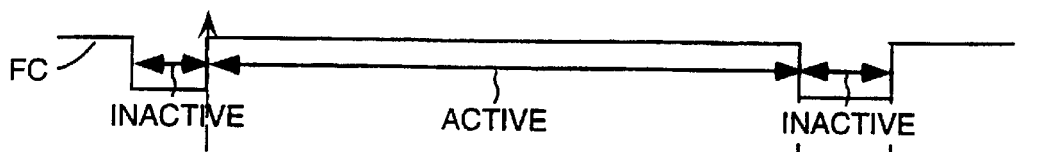
FIGS. 2A and 2B illustrate inventive arrangements for bus communication employing a superpacket.
Figure 2B:
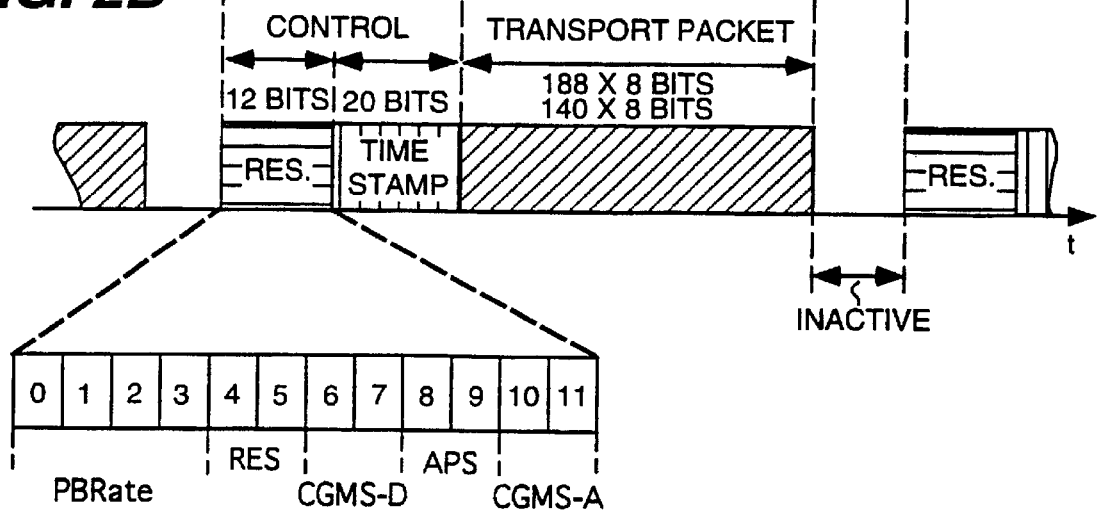

The demultiplexed user selected program transport stream TP may be formatted at block 108, for example as a superpacket, as illustrated in FIG. 2B. A superpacket comprises the user selected transport stream packets TP and a control data header. FIG. 2B shows an exemplary control data header of 32 bits which includes a time stamp TS, copy control data bits, bits which may determine recorder play back rate, and two bits reserved for future usage. The superpacket SP is coupled via an audio, video and data bus 500 to a recording or replicating device 200. Data bus 500 is received by interface port 102 and coupled to demux 30 which reads the exemplary control data. The copy control data bits may assert a number of possible control conditions, for example, unlimited copying, single copy replication or copying prohibited. Thus to achieve the required control conditions, the copy control data bits are coupled to controller 208 which is controllably coupled to various replicator sub-systems. A detailed description of the various control aspects resulting from the copy control conditions is provided later.

Superpackets SP or SPa are coupled for recording, replication or copying processing at block 206A. The superpackets may be processed for error detection and correction and may also be transformed to modify their spectral energy content. An output signal stream from block 206A is coupled to form copy 210 on medium 299, for example a magnetizable surface. When recorder 200 is operated in a reproduction mode, copy 210 is transduced from medium 299 and coupled to playback processor 206B. Playback processor 206B essentially reverses any record signal encoding and may detect and correct errors in copy 210 resulting from the recording medium 299. The error corrected signal PBSP is coupled to demultiplexor 31 and superpacket restorer 32. The control data header of the play back superpacket PBSP is read by demultiplexor 31 and coupled to various locations. The time stamp PBTS from the header is coupled to clock controller 39 where the time stamp value is employed to determine the output packet timing or initiation of an output superpacket RSP from block 32. The replayed, restored superpacket RSP is coupled to interface 102 for transmission to integrated receiver decoder IRD 100 via AVD bus 500.

It is assumed that the signal to be communicated is provided in the form of transport packets such as defined in the system layer of the MPEG2 video standard, or the transport layer of the Grand Alliance signal format. In both the MPEG2 video standard and the transport layer of the Grand Alliance signal format, transport packets are associated with timestamps or PCRs which allow re-synchronization of local system clocks to the original encoder clock frequency. Hence, having synchronized the local system clock generator, the transport packets may be processed to remove jitter or timing perturbations which may accumulate, for example, during transmission by switched bus structures and processing etc. In FIG. 1 the program clock reference PCR, is read by demultiplexor 102 and coupled to synchronize clock oscillator 17, which has a nominal frequency of 27 MHz. The MPEG standard allows for an intermittent occurrence of the program clock reference PCR within transport stream. The resultant intermittent oscillator synchronization is fully adequate to permit MPEG decoding. However, the transport packet stream may be subject to timebase modulation, for example resulting from mobile transmission, causing signal flutter and mutlipath transmission reflections. Timebase modulation may also result from recording and replay buffering and mechanically instabilities. Such timebase variations or errors may exceed the oscillator synchronization range or rate of change, hence each transport packet is repackaged to form a superpacket containing a timestamp specific to the occurrence of the transport packet it contains. The provision of a timestamp for each transport packet permits the correction of unwanted timebase modulation and facilitates the delivery of each transport packet to the decoder at substantially the same time as the transport packet would have been decoded had it not been recorded and or perturbed.

FIG. 2B illustrates a superpacket which comprises a control data header of 32 bits and a transport packet of either 188 bytes or 140 bytes representing respectively the GA or DirecTV™ systems signals. The control data header includes a 20 bit time stamp, 6 bits of copy control data, a 4 bit playback rate code and 2 bits of reserved data. The timestamp is a sample of an oscillator count taken at a specific instant, for example, at the occurrence of a frame clock pulse FC, and as described, may be utilized for the correction of timing jitter and perturbations impressed on each superpacket. The playback rate code may be used by a recording device to determine the rate at which a particular signal is to be recorded or played back. The playback rate is coded relative to the recording rate and is read and utilized by any recording devices connected to the AVD bus. The purpose of the playback rate code is to allow recording at a relatively high bit rate and playback at a normal bit rate. Copy control data comprises three 2 bit words which provide control of, digital copy control or CGMS-D, analog copy control or CGMS-A and control information for an analog APS system developed by MACROVISION™. Table 1 shows the allocation and function of 6 copy control data bits.

TABLE 1

| Bit 6 | Bit 7 | CGMS-D DIGITAL COPY CONTROL INFORMATION |
|---|---|---|
| 0 | 0 | Unlimited copying permitted |
| 1 | 0 | Only one copy permitted |
| 1 | 1 | Copying prohibited |
| Bit 8 | Bit 9 | APS ANALOG CONTROL INFORMATION |
| 0 | 0 | Dynamic control of MACROVISION parameters |
| 0 | 1 | Dynamic control of MACROVISION parameters |
| 1 | 0 | Dynamic control of MACROVISION parameters |
| 1 | 1 | Dynamic control of MACROVISION parameters |
| Bit 10 | Bit 11 | CGMS-A ANALOG COPY CONTROL INFORMATION |
| 0 | 0 | Unlimited copying permitted |
| 1 | 0 | Only one copy permitted |
| 1 | 1 | Copying prohibited |

Various equipment system combinations may be envisioned comprising, for example, analog or digital recorder players, such equipment may present differing connection and control capabilities, and in addition operation in recording and or replay modes must be considered. These various combinations may be broadly separated into several exemplary systems.

FIG. 1 depicts a first exemplary system where a digital receiver and display are coupled to a digital recorder by a simple data bus configuration. However, regardless of the data bus configuration, copy control or CGMS data must be recovered or demultiplexed from the selected packet stream and formatted for coupling to the recording or replicating device. The recorder or replicator must demultiplex or recover the formatted copy control bits and implement the control function specified therein. In FIG. 1 copy control data is demultiplexed from the selected transport packet stream at block 104 and coupled to a copy control word generator at block 105. Superpackets are formatted at block 108 which combines the selected transport packet stream with the copy control word from block 105, a timestamp from block 107 and a playback rate code from block 106.

As already described the 6 bit copy control word provides for control of both digital and analog systems. Hence in the first exemplary system of FIG. 1, demultiplexor block 30 of digital recorder 200, extracts the digital copy control or CGMS-D commands present as bits 6 and 7 of the superpacket header. Bits 6 and 7 define three states, namely, unlimited copying, no copying or only one copy permitted. Separated bits 6 and 7 are coupled to control block 208 which is controllably coupled to various subsystems of recorder 200. Clearly, if CGMS-D bits 6 and 7 indicate a first state which permits unlimited copying, no control action is required by controller 208 and copy 210 may be formed on medium 299.

When CGMS-D bits 6 and 7 indicate a second state which prohibits copying, controller 208 may disable record processor 206A by means of control line INH. In addition an electronic signal path, or EE mode, through the recorder may be inhibited responsive to copy prohibition by bits 6 and 7. Controller 208 may also cause the generation of an on-screen display message indicating the prohibited recording status of the user selected program. The on-screen display message may generated within recorder 200 or be caused to be generated within IRD 100.

Advantageously, integrated receiver decoder 100 may demultiplex and interpret CGMS-D bits 6 and 7. Thus when a prohibited recording status is required, coupling of transport packets or superpackets to the serial data bus may be inhibited within IRD 100. In addition the interpreted status of the 6 copy control bits may be presented for user information as an on-screen display.

The third state defined by bits 6 and 7, namely one copy permitted, requires that the copy control bits be amended prior to or concurrent with replication by recorder 200. Thus CGMS-D command bit 7 of the superpacket header is changed, as indicated in table 1, from logical 0 to logical 1. In FIG. 1 superpacket SP from demux is coupled to block RESET CC 204 which amends the logical state of bit 7 responsive to control signal RS generated by controller 208. Hence a single copy 210 of the exemplary superpacket SP is replicated which contains a CGMS-D command prohibiting any further copying.

In a further advantageous control situation the copyright owner may establish a differential pricing structure where an exemplary live event may be priced higher for live viewing than for a time shifted, or non-real time viewing resulting from a recording of the live event. Thus CGMS-D bits 6 and 7 may indicate the third state permitting a single copy, with decoder inhibition signalled by, for example, at least one bit within the playback rate area or the reserved data bits. However, other copying or copyright control data resident in the users selected program stream may be demultiplexed at, for example block 104. Such filtered or demuxed control data from block 104 may be coupled to controller 111 to inhibit decryption by block 103, and or decoding at 109, of the received signal for immediate, real time viewing at display 99. In addition controller 111 may communicate this viewing inhibit command via the control conductor CRL of data bus 500 to recorder 200RP. Control commands from data bus 500 are coupled to controller 208 which inhibits, via signal INHPB, electronic or EE coupling of the input packet signal to the recorder output. Reproduction and output data generation of the recorded copy is facilitated, even though the copy comprises transport packets containing the embedded viewing inhibit command, because exemplary bit 7 of the copy control word was amended when recorded to prohibit further copying. Thus IRD 100 may logically compare the status of exemplary bits 6 and 7 with the embedded viewing inhibit command and deduce that the replay only copy may be decoded for non-real time viewing at display 99.

Figure 3A:
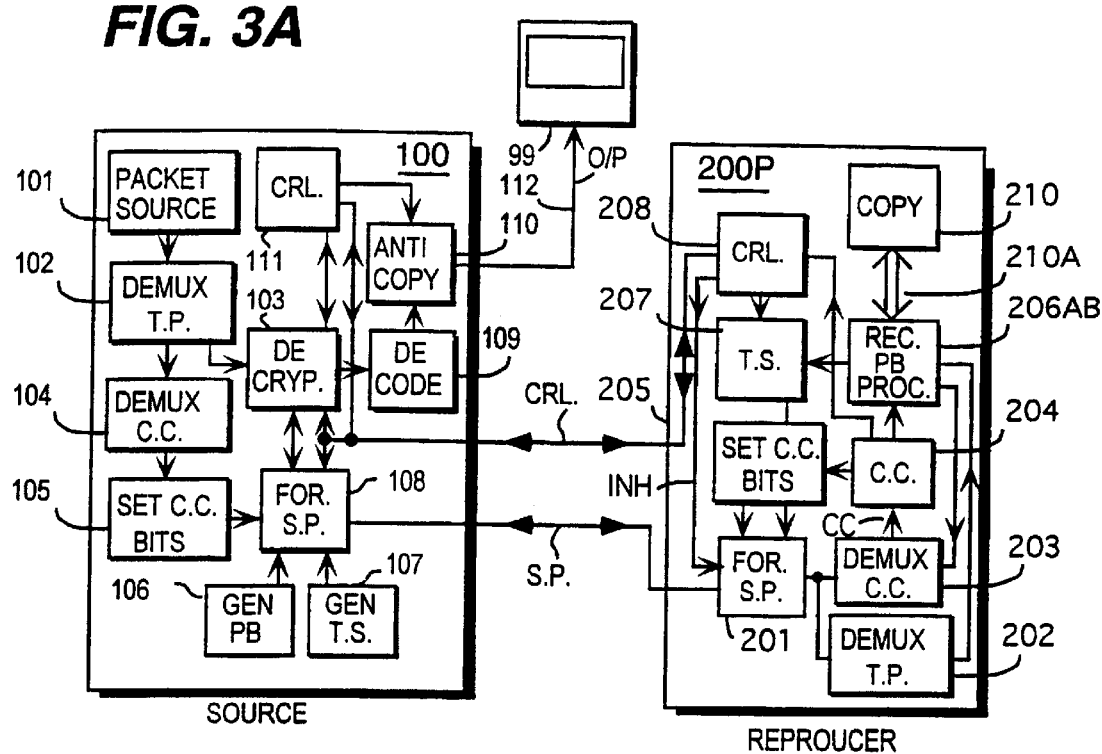
FIGS. 3A and 3B illustrate exemplary bus connected digital sources and replication systems including inventive arrangements.

FIG. 3A depicts as functional blocks a second exemplary system where a digital recorder player 200P is coupled to a digital receiver 100 and display 99 via a simple data bus configuration. Functional blocks of FIG. 3A which provide the same function as those depicted in FIG. 1 are similarly numbered. FIG. 3A depicts the reproduction of copy 210, from an unshown medium, where copy 210 includes digital copy control or CGMS-D commands present in both the exemplary superpacket header and the transport packet.

The copy control bits define the three states described above. Clearly, if the copy control bits permit unlimited copying, no control response is required or initiated by reproducer 200P. The second and third copy control states preclude copying or permit only a single copy. However, since FIG. 3A depicts digital reproduction of copy 210 from player 200P to digital receiver 100, and to display 99, once again no control response is required or initiated by reproducer 200P since receiver 100 is assumed incapable of replication.

Figure 3B:
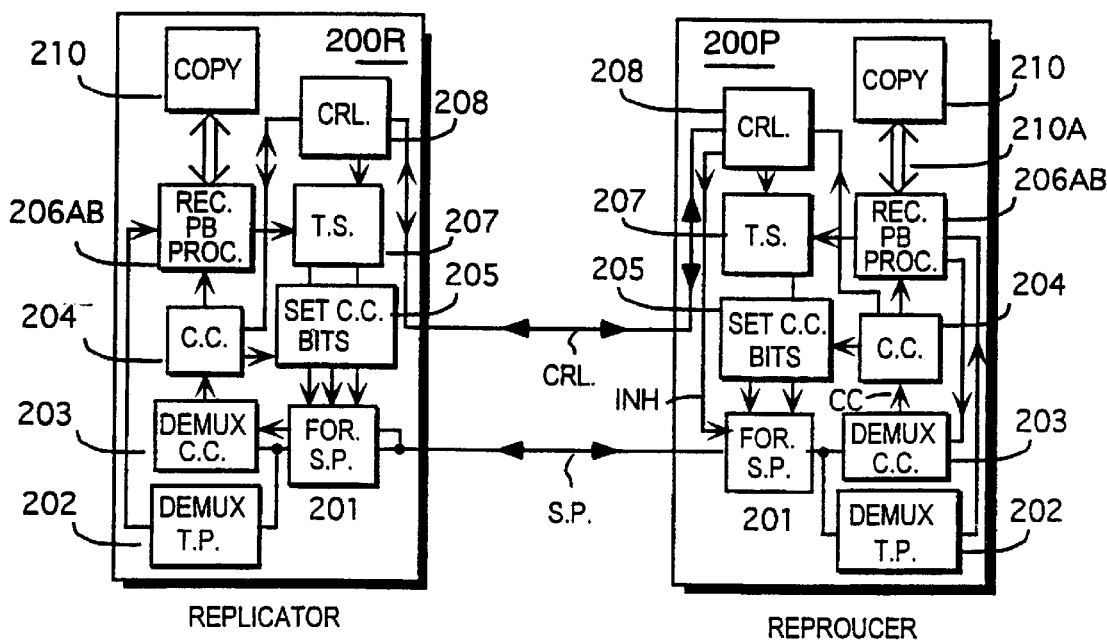

However, FIG. 3B depicts an interconnection between digital reproducer 200P and digital replicator 200R, which requires execution of copy control responses determined by the bits reproduced by reproducer 200P. Clearly in both FIGS. 3A and 3B, reproducer 200P transduces copy 210 for differing signal destinations and uses, namely decoding and viewing in FIG. 3A and replication in FIG. 3B. As described with respect to FIG. 1, digital replicator 200R may demultiplex copy control bits from the exemplary superpacket, depicted at block 203 and communicate the required copy control action to controller 208. Thus as described for FIG. 1, copying may be permitted, prohibited or a single copy allowed with that copy's respective copy control bit amended to prohibit further copying.

The differing signal destinations and consequential uses of transduced copy 210 may be advantageously determined by reproducer 200P by means of serial data control line CRL. For example, during reproduction of copy 210, demultiplexor 203 may extract and interpret CGMS-D bits 6 and 7 of the exemplary packet header. When bits 6 and 7 prohibit copying, controller 208 may poll via control line CRL to determine the destination of the transport packets or superpackets about to be coupled via the serial data bus. Control via a data bus is well known and may be implemented in various forms, for example, controller 208 may generate a message requiring responses from all bus nodes thereby identifying apparatus coupled to the control bus. Thus transport packets or superpackets may be coupled for decoding and viewing but may be inhibited from bus coupling to a recording device. Alternatively controller 208 may specifically address the transport packets or superpackets to a non-replicating destination, for example decoder 100/109.

Thus copy 210, with copying prohibited, may be coupled for decoding and viewing but may be inhibited from bus coupling responsive to a determination of the apparatus present on the bus, for example digital replicator 200R.

In the discussion of FIGS. 1, 3A and 3B, it was assumed that the recording or replicating devices are capable of demultiplexing the exemplary copy control word from the exemplary packet header. However, in replicating devices which may fail, or be incapable of demultiplexing copy control data, copy control management may be facilitated by means of the control line CRL. As discussed for FIG. 1, copy control data may be filtered or demultiplexed from the selected program stream at block 104. The copy control data may be coupled to controller 111 for periodic bus transmission via control line CRL. Thus copy control data may be coupled to replicator controller 208 thereby facilitating the required copy management. In replicating devices incapable of amending the copy control bits when required by single copy authorization, the replicating device will transmit via the control line the correct copy control data, namely copying prohibited. The control line copy control data will be transmitted periodically, for example at least once per second. When a replicating device determines a difference between copy control data received via control line CRL and that demuxed from the packet header, the device inhibits recording or replication. However, in the eventuality that copy control data is absent from control line CRL for a predetermined time period, for example 10 seconds, the packet header CGMS data is then assumed correct and copy management is facilitated.

Figure 4:
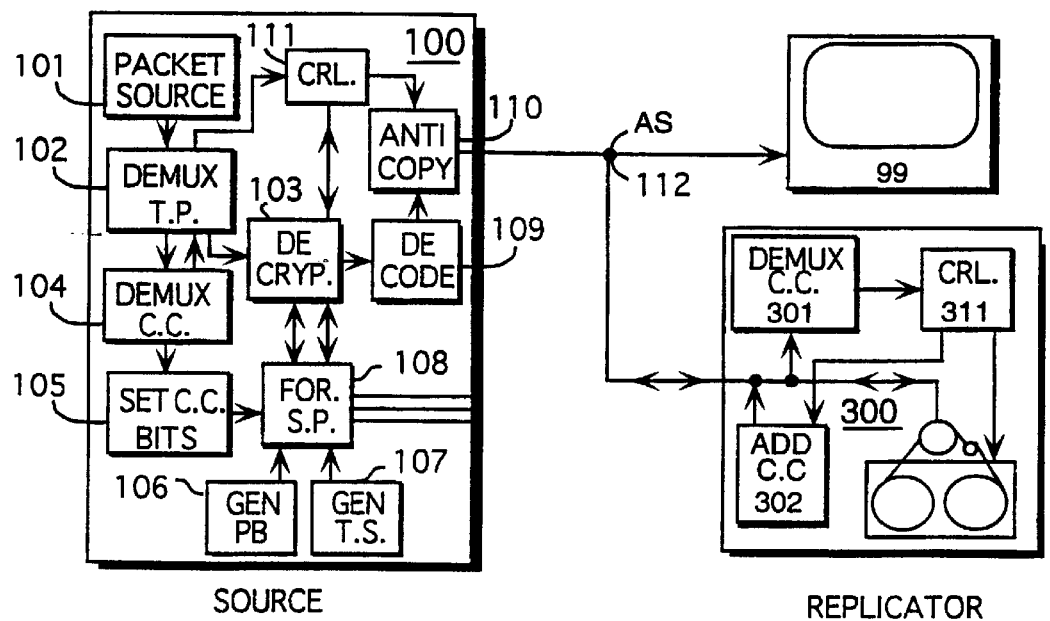
FIG. 4 illustrates an exemplary digital signal source and analog replication device including inventive arrangements.

FIG. 4 depicts an analog recorder/replicator 300 coupled to an analog signal AS, decoded from a digital signal source by integrated receiver decoder 100. An analog taping flag is demultiplexed, for example by block 104, from an exemplary DSS™ electronic program guide. The demuxed taping or copy control data is coupled to controller 111 which in turn invokes the required copy management control by means of anti-copying device 110, for example a MACRO-VISION™ apparatus. As shown in Table 1, analog CGMS-A provides the same three copying conditions as CGMS-D, namely, unlimited copying, copying prohibited and one copy permitted.

In the unlimited copying condition analog output signal AS passes through anti-copy block 110 without signal modification or addition. When copying is prohibited, anti-copy block 110 modifies the decoded analog signal AS such as to render a copy unusable but still permit direct viewing of the decoded analog signal on display 99. The third control condition, namely one copy only, requires that analog signal AS be modified prior to copying to indicate that copy contains material for which copying is prohibited. The recording prohibition may be encoded during a vertical blanking interval of the analog signal, for example by use of line 21. In FIG. 4 the demultiplexed CGMS-A may be encoded as described on exemplary line 21 of the vertical blanking interval or signal AS. When analog signal AS is received by replicator 300 line 21 is demultiplexed at block 301. When the third copy management condition is read from the copy control data controller 311 enables multiplexor adder 302 which modifies the data on line 21 to reflect a recording prohibited status.

What is claimed is:

1. Apparatus for processing a source of compressed digital video and control data occurring in transport packets and including means responsive to said source for deriving copy control data from said transport packets, comprising:

means responsive to said copy control data for generating a copy control word;

means for forming a superpacket including said copy control word and said transport packets; and, means coupled to said forming means for coupling said superpacket including said copy control word and said transport packets to a data bus.

2. Apparatus of claim 1, wherein said copy control word indicates a control condition enabling multiple replication.

3. Apparatus of claim 1, wherein said copy control word indicates a control condition prohibiting replication.

4. Apparatus of claim 1, wherein said copy control word indicates a control condition enabling only one replication.

5. Apparatus of claim 1, wherein a decoder is controlled responsive to said copy control data for enabling transport packet signal decoding in a first condition of said copy control data and disabling transport packet signal decoding in a second condition of said copy control data.

6. Apparatus of claim 5, wherein said second condition of said copy control data enables said coupling of said superpacket to said data bus.

7. Apparatus of claim 1, wherein said data bus couples said superpacket to a replicating device for control by said copy control word.

8. Apparatus for processing a source of digital video and control data occurring in transport packets, comprising:

means responsive to said source for deriving copy control data from said transport packets; and, control means responsive to said copy control data for controlling coupling of said transport packets to a data bus for transmission and for controlling transport packet signal decoding, wherein said copy control data being representative of copying permitted said control means enables coupling of said transport packets to said bus and disables transport packet signal decoding.

9. Apparatus for copying compressed digital video and control data occurring in a superpacket, said apparatus comprising:

source of said superpacket wherein said superpacket includes a copy control word and a transport packet;

means responsive to said source of said superpacket for reading said copy control word from said superpacket;

means coupled to said source for copying said superpacket to a medium; and, control means responsive to said copy control word for controlling copying by said copying means.

10. Apparatus of claim 9, wherein said copy control word is indicative of a control condition enabling multiple copies.

11. Apparatus of claim 9, wherein said copy control word is indicative of a control condition prohibiting copying.

12. Apparatus of claim 9, wherein said copy control word is indicative of a control condition enabling only one copy.

13. Apparatus of claim 12, wherein responsive to said copy control word indicative of said only one copy said control means amends said copy control word to indicate copying prohibited.

14. Apparatus of claim 12, wherein responsive to said copy control word indicative of said only one copy said control means amends said copy control word to indicate copying prohibited in a superpacket coupled for copying.

15. Apparatus of claim 14, wherein said only one copy includes said copy control word amended to prohibit copying.

16. Apparatus of claim 9, wherein a copy generated by said copying means includes a superpacket and said copy control word.

17. Apparatus of claim 9, wherein said copy control word permits only one copy, a copy generated by said copying means includes a superpacket and a copy control word prohibiting copying.

18. Apparatus of claim 9, further comprising means for receiving a control signal indicative of copy control data.

19. Apparatus of claim 18, wherein control means is responsive to one of said copy control word and said control signal indicative of said copy control data.

20. Apparatus of claim 17, wherein a copy control word prohibiting copying is coupled to generate a control signal for coupling to a control signal conductor.

21. Apparatus of claim 9, wherein responsive to said copy control word, during said copying condition signal INHPB inhibits an ouput transport packet signal from said copying apparatus.

22. Apparatus of claim 9, wherein responsive to said control signal transport packet signal decoding is enabled in a first condition and transport packet signal decoding is dissabled in a second condition.

23. Apparatus of claim 22, wherein said second condition enables copying.

24. A recording device comprising:
receiving means responsive to a source of compressed digital video and control data occurring in transport packets and including data for copy control, said receiving means being responsive to a copy control word, coupled thereto and generated responsive to said copy control data, wherein said receiving means of said recording device periodically receives said copy control word and absent equality between said copy control word and said copy control data said recording device assumes a copy prohibited status.

25. The apparatus of claim 24, wherein said source of compressed digital video and control data occurring in transport packets and including data for copy control is another recording device.

26. Apparatus for recording compressed digital video and control data occurring in transport packets, comprising:

first means coupled for receiving a superpacket signal including a copy control word and a transport packet;

second means coupled for receiving control data including data representative of copy control data;

means coupled to said first receiving means for reading said copy control word from said superpacket;

means coupled to said receiving means for copying said superpacket; and, control means coupled to said reading means and said second receiving means for controlling said copying means responsive to correspondence between information represented by said copy control word and information represented by said control data representative of said copy control data.

27. The apparatus of claim 26, wherein said second means periodically receives said data representative of said copy control data and absent said periodic reception said recording device assumes a copy prohibited status.

28. Apparatus for processing a source of digital video and control data occurring in transport packets, comprising:

means responsive to said source for deriving copy control data from said transport packets; and, control means coupled to a bus for determining an apparatus presence at a destination and responsive to said copy control data controlling coupling of said transport packets to said destination, wherein said copy control data being representative of copying prohibited and said control means determines a presence of a replicating apparatus at said destination said control means inhibits coupling of said transport packets to said destination, and in a second condition said control means determines an absence of said replicating apparatus said control means enables coupling of said transport packets to said destination.

* * * * *